United States Patent [19]

Führing

[11] Patent Number: 4,626,351
[45] Date of Patent: Dec. 2, 1986

[54] FILTER, ESPECIALLY FOR DRY-CLEANING MACHINES

[75] Inventor: Heinrich Führing, Augsburg, Fed. Rep. of Germany

[73] Assignee: Bowe Reinigungstechnik GmbH, Augsburg, Fed. Rep. of Germany

[21] Appl. No.: 719,745

[22] Filed: Apr. 4, 1985

[30] Foreign Application Priority Data

Apr. 10, 1984 [DE] Fed. Rep. of Germany ....... 3413467

[51] Int. Cl.$^4$ ............................................. B01D 29/34
[52] U.S. Cl. ..................................... 210/331; 210/334
[58] Field of Search ............... 210/332, 334, 407, 408, 210/413, 360.2, 391, 397, 330, 331

[56] References Cited

U.S. PATENT DOCUMENTS 1,219,796  3/1917  Atkins et al.
3,857,786  12/1974  Wolf .................................... 210/334

FOREIGN PATENT DOCUMENTS 964322   5/1957   Fed. Rep. of Germany.
2218898  10/1973  Fed. Rep. of Germany.
2507762  11/1975  Fed. Rep. of Germany.
2507202  12/1975  Fed. Rep. of Germany.
2646693  4/1978   Fed. Rep. of Germany.
3300394  7/1984   Fed. Rep. of Germany.

Primary Examiner—Frank Sever
Attorney, Agent, or Firm—Karl F. Ross; Herbert Dubno

[57] ABSTRACT

A filter device for a cleaning machine includes a plurality of disk-like filter elements accommodated within a casing and connected to a hollow shaft to be rotatable therewith. Arranged between adjacent filtering elements are stationary disks which extend from the casing inner wall towards the shaft. Each disk is provided at its both sides facing the filtering surface of the filtering elements with at least one rib which extends in radial direction and projects towards the filtering surfaces. These ribs cooperate with projections provided on the filtering elements in such a manner that only a narrow gap is defined when the projections pass the stationary ribs during rotation of the filtering elements. Consequently, the ribs and the projections work like vanes of a turbine and cause strong currents to provide a cleaning effect of the filter fabric.

6 Claims, 4 Drawing Figures

FILTER, ESPECIALLY FOR DRY-CLEANING MACHINES

FIELD OF THE INVENTION

My present invention relates to a filter device for a cleaning machine, especially for a dry-cleaning machine.

BACKGROUND OF THE INVENTION

U.S. Pat. No. 1,219,796 describes a centrifugal filter having a casing accommodating a plurality of disk-like filtering elements which are in superimposed relation at a distance to each other and connected to a centrally extending hollow shaft. Each of the filtering elements consists of perforated plate covered by a wire mesh. Projecting into the space between two adjacent filtering elements are short pipes which extend radially and terminate adjacent the center of the casing. These pipes are provided with openings and communicate with an inlet pipe so as to allow the fluid to be filtered to be discharged into the interior of the casing and against the rotating filtering elements.

During the rotation of the filtering elements and of the fluid to be filtered, these short pipes cause turbulences by which dirt particles adhering to the surface of the elements are washed away.

The German patent publication DE-OS No. 2,507,762 discloses a filter including a plurality of coaxial and stationary disk-like filtering elements which are accommodated within a filter casing. The filter elements extend from the casing wall inwardly towards the hub of a rotor shaft which traverses the casing. Connected to the rotor shaft and extending between the filter elements are a plurality of rotating disks which may also be provided as disk-like filtering elements At their outer circumference, the disks are provided with vanes or blades Likewise, the stationary filtering elements may be provided with vanes or blades at the inner edge facing the hub.

These vanes or blades are provided to remove accumulation of solid materials from the outer periphery in the area of the inner wall of the casing as well as from the hub zone.

The German publication DE-AS No. 2,507,202 describes a similar filter in which the rotating disks are provided with curved vanes to provide the formation of a filter cake of predetermined thickness.

The filter described in the German publication No. 964,322 includes rotating disk-like filtering elements which are provided with vanes for stirring the bottom sludge.

OBJECTS OF THE INVENTION

It is the principal object of the present invention to provide a filter which provides an improved cleansing effect of its filtering surface so as to increase the service life of the entire filter.

Another object is to provide an improved filter for dry cleaning machines which overcomes drawbacks of earlier systems.

SUMMARY OF THE INVENTION

I realize this object, according to the present invention, by providing turbulence inducing means extending in front of the filtering surface of each filtering element and cooperating with projections arranged in radial direction on the filtering surfaces so that strong turbulence is generated when the filter elements and the turbulence-inducing means are rotated relative to each other. This turbulence results in a removal of deposits from the filtering surfaces. The turbulence-inducing means are radial ribs extending from the filter surfaces and stationary ribs close-spaced from the rotating ribs.

The turbulence inducing means include a plurality of disks which are respectively arranged between two adjacent filtering elements whereby each disk is provided at its both sides facing the filtering surfaces with one or more ribs whose outer edges have a contour essentially corresponding to the opposing contour of the outer edge of the projections so that a narrow gap, preferably a parallel gap, is defined between the opposing outer edges of projections and ribs.

Through the provision of such a filter, a thorough cleansing of the filter fabric is obtained during rotation of the filter elements because strong turbulences and violent currents of the fluid to be filtered—e.g. a solvent used in chemical cleaning or water—is provided in the spaces between the filtering elements.

Upon rotation of the filtering elements, the projections work during rotation like a turbine wheel while the then stationary ribs act like stationary vanes of such a turbine. Thus, a strong current is achieved not only in circumferential direction but primarily also in axis-parallel (axial) direction so as to wash and cleanse the filter fabric or like filter layers. Through exact alignment of the outer edges of opposing ribs and projections, the cleansing and flushing effect of the filter can be improved.

I may note that the cleansing of the filter fabric can in addition be promoted by reversing the flow direction of the fluid to be filtered.

According to a further feature of my invention, the filtering surface is covered by a terylene-molleton fabric which is easily cleaned and whose surface includes very long and closely adjoining fibers for retaining the dirt.

It is obvious that the filter device according to the invention provides superior cleansing action and thus has a much longer service life than prior art filter devices. I may also note that the relative rotational movement between the filtering elements and the ribs of the turbulence inducing means can be provided by either maintaining the ribs stationary and to allow the filtering elements to be rotated by the shaft, or also vice versa which means that the ribs are rotated by respective driving means while the filtering elements as well as the shaft are kept stationary.

BRIEF DESCRIPTION OF THE DRAWING

The above and other objects, features and advantages of my present invention will now be described in more detail with reference to the accompanying highly diagrammatic drawing in which.

SPECIFIC DESCRIPTION

Figure 1:
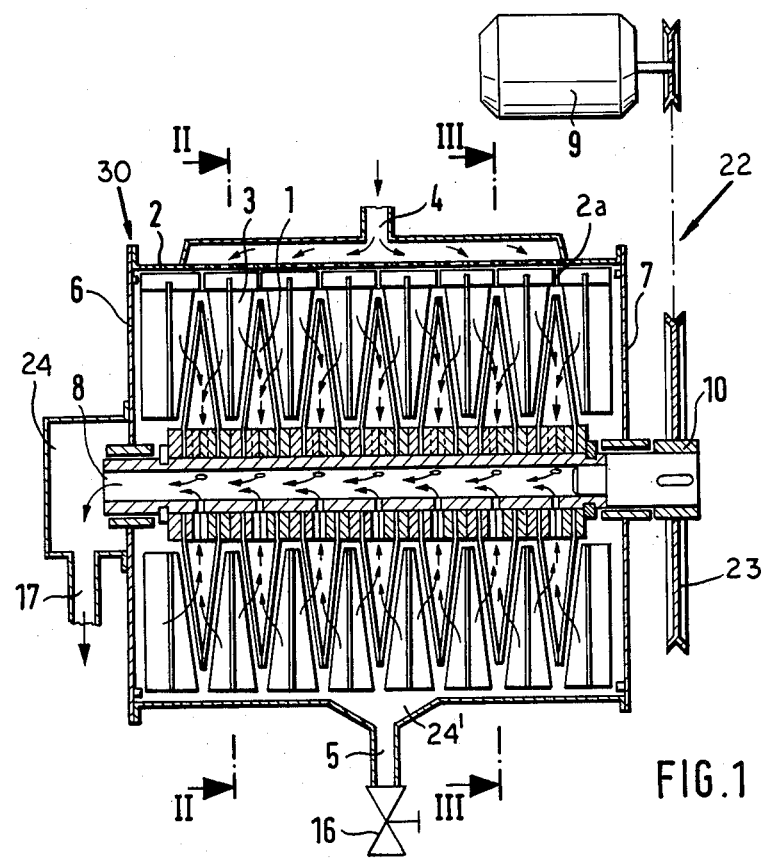
FIG. 1 is a longitudinal sectional view of a filter device according to the invention.
Figure 2:
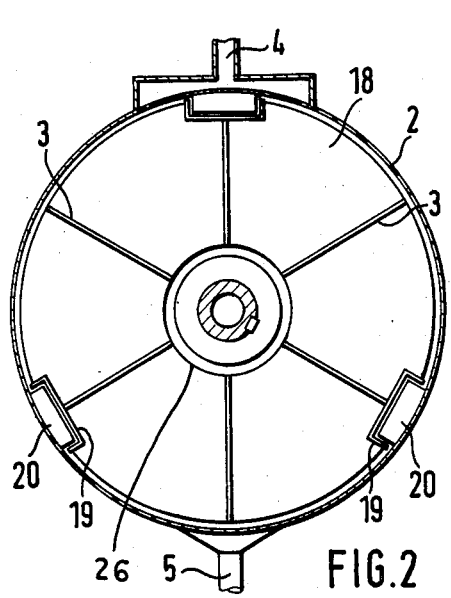
FIG. 2 is a cross sectional view of the filter device taken along the line II—II in FIG. 1.

FIG. 1 shows a rotary disk filter generally designated by reference numeral 30. The filter includes a cylindrical casing 2 which is closed at its horizontal ends by plates 6, 7.

Traversing the casing 2 in horizontal direction is a central hollow shaft 8 which is rotatably supported by the end plates 6, 7 and is connected to a motor 9 via a belt drive 22.

For reasons of simplicity, the belt drive is only indicated by line 22; its lower pulley indicated by arrow 23 is keyed to the shaft 8 by hub 10.

The casing 2 is provided along an upper circumferential section with a perforated top portion 2a which communicates with an inlet pipe 4. Through inlet pipe 4, fluid to be filtered e.g. an organic solvent, is introduced into the interior of the casing 2. At a lower circumferential portion, the casing 2 is provided with a central funnel 24 which is connected to an outlet pipe 5 for allowing dirt and deposits to be discharged. The discharge through the pipe 5 is controlled by a valve 16.

At its extremity remote to the end plate 7 and the belt drive 22, the shaft 8 projects into a chamber 24 which communicates with an outlet pipe 17 for the filtered fluid.

The shaft 8 is connected to a plurality of disk-like filtering elements 1 which extend radially in axial spaced relationship along the length of the shaft 8 within the interior of the casing 2.

Figure 4:
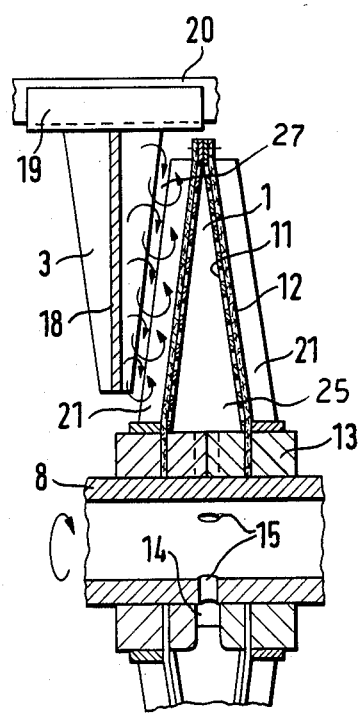
FIG. 4 is an illustration on an enlarged scale of one filtering element of the filter device.

As can be seen from FIG. 4, each filtering element 1 consists of a pair of outwardly converging perforated sheet metal walls 11 which define an inner space 25 and are fixed at its lower extremities via a hub 13 to the central shaft 8 so as to be rotatably connected with the latter.

Depending on the demand, the shaft 8 can be operated to rotate intermittently or also continuously.

The sheet metals 11 essentially form a triangular cross section whose tip faces the circumference of the casing 2 and have an outer filtering surface 12 which extends transversely to the shaft axis. The filtering surface 12 is covered by a filter mesh preferably made of terylene-molleton fabric whose surface is defined by very long and closely adjoining fibers for retaining the dirt.

In order to connect the inner space 25 of each filtering element 1 with the interior of the hollow shaft 8, the hub 13 is provided with respective through-passages 14 which extend in radial direction and communicate with boreholes 15 provided in the shaft 8. The boreholes 15 register and communicate with the through-passages 14.

Projecting into the space between two adjacent filtering elements 1 as well as between the outermost filtering elements 1 and the associated end plates 6, 7 are stationary disks 18 each of which carrying a plurality of ribs or webs 3 at its both sides facing the filtering elements 1 and being provided with a central cutout 26 to allow the shaft 8 to traverse therethrough. The ribs 3 project in axial direction towards the filtering elements 1 and are of wedge-like shape converging in radial direction so as to extend within the casing 2 in radial direction inwardly to outwardly along the disk 18.

Uniformly spaced along its periphery, the disk 18 is provided with recesses 19 which receive respective guide beads 20 extending in axial direction along the innerside of the casing 2.

Cooperating with the ribs 3 of the disks 18 are a plurality of projections (ribs) 21 (FIG. 4) extending in radial direction along the filtering element 1. The projections 21 which may be of vane like shape are fixed to the filtering surface 12 over the filter tissue and with their lower end connected to the hub 13 so as to rotate simultaneously with the respective filtering elements 1. As can be seen from FIG. 4, the axially outwardly edge of each projection 21 lies in close proximity to the edge of the ribs 3 when opposing each other during rotation of the filtering elements 1 whereby the contour of the edges of opposing projections 21 and ribs 3 correspond to each other. Consequently, a narrow gap 27 (e.g. a parallel gap of rectilinear shape as shown in FIG. 4) is defined when the projections 21 pass the ribs 3.

Figure 3:
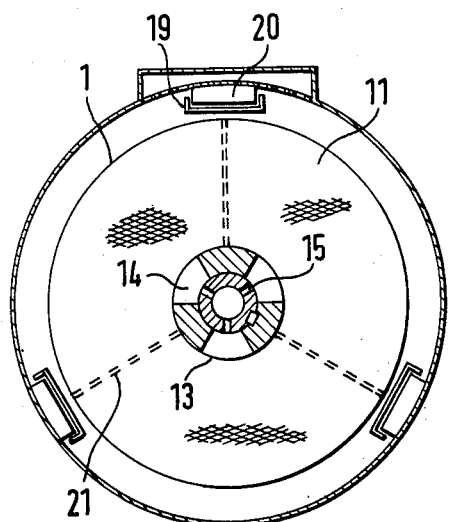
FIG. 3 is a cross sectional view of the filter device taken along theline III—III in FIG. 1.

I may note that the number of projections 21 extending on the filter surface 12 is arbitrary and is not dependent on the number of ribs 3 arranged on the disk 18. Therefore, there may be a larger, equal or smaller number of projections 21 in comparison to the number of ribs 3. In the embodiment shown in FIG. 3, three such projections 21 are illustrated which, however, are indicated only by dotted lines as in this cross sectional view the projections 21 extend behind the drawing plane.

During operation, the fluid to be filtered is introduced into the rotating filter 30 through inlet pipe 4 and flows, as indicated by the arrows, along the filtering surface 12 into the interior 25 of the filtering elements 1 and through the passages 14 and boreholes 15 into the interior of the hollow shaft 8. The filtrate is then discharged through outlet 17. Dirt or deposits adhering to the filter tissue is removed by the interaction between the ribs 3 and the passing elements 1 i.e. by the induced turbulences of the fluid. Especially, the provision of the projections 21—in particular upon quick rotation—and their relative movement with respect to the ribs 13 create strong turbulences of the fluid to be filtered so that dirt is removed during operation and drops to the bottom where it is discharged through outlet 5 when actuating valve 16. Therefore, the provision of the projections 21 increases the cleaning effect of the filter tissue so that the service life of the filter 30 is extended.

Although in this embodiment, the disks 18 are described as being stationary while the filtering elements 1 are rotatable, I may note, however, that it is certainly within the scope of the invention to provide the filtering elements 1 in a fixed position while the disks 18 with their ribs 3 are rotated.

I claim:
1. A filter, particularly for a dry-cleaning machine, comprising:
   a casing defining an axis;
   a hollow rotatable shaft traversing said casing in direction of said axis and defining an interior;
   a plurality of filtering elements accommodated within said casing and communicating with the interior of said shaft, each of said filtering elements having a filtering surface extending transversely to said shaft; and
   turbulence-inducing means juxtaposed with each of said filtering surfaces of each filtering element for allowing removal of deposits from said filtering surfaces, said filtering elements being provided with elongated projections extending outwardly along said filtering surfaces from inner locations to outer peripheries thereof and cooperating with the said turbulence-inducing means to increase turbulence upon a relative rotation of said filtering elements and said turbulence-inducing means, said turbulence-inducing means including respective disks respectively lying between pairs of said filtering elements, said disks being provided at each side thereof with at least one rib arranged parallel to a respective filtering surface, said projections having an outer edge extending in close proximity to edges of said ribs so as to define a narrow gap therebetween.

2. The filter defined in claim 1 wherein said edges of said ribs and the opposing outer edge of said projections have a corresponding contour.

3. The filter defined in claim 1 wherein said filtering surfaces are covered by a terylene-molleton fabric.

4. The filter defined in claim 1 wherein said projections are of vane shape.

5. The filter defined in claim 1 wherein said filtering elements are connected to said shaft so as to be rotatable, said turbulence-inducing means being stationarily fixed to said casing.

6. The filter defined in claim 1 wherein said projections are related and the juxtaposed edges of said projections and said ribs are arranged parallel to each other so that said gap is of rectilinear shape.

* * * * *